United States Patent
Vaicunas et al.

(10) Patent No.: US 6,902,463 B2
(45) Date of Patent: Jun. 7, 2005

(54) FRICTION GAME CALL APPARATUS WITH EXTERNAL SOUND CHAMBER

(75) Inventors: Paul A. Vaicunas, Stow, OH (US); Wilbur R. Primos, Madison, MS (US)

(73) Assignee: Primos, Inc., Flora, MS (US)

( * ) Notice: Subject to any disclaimer, the term of this patent is extended or adjusted under 35 U.S.C. 154(b) by 0 days.

(21) Appl. No.: 10/634,226

(22) Filed: Aug. 5, 2003

(65) Prior Publication Data

US 2005/0075042 A1 Apr. 7, 2005

(51) Int. Cl.[7] .................................................. A63H 5/00
(52) U.S. Cl. ......................... 446/397; 446/404; 84/402
(58) Field of Search .................................. 446/397, 176, 446/180, 418, 213, 404; 224/240, 222; 84/402, 410, 408

(56) References Cited

U.S. PATENT DOCUMENTS

| | | | |
|---|---|---|---|
| 1,548,628 A | 8/1925 | Petrie | |
| 2,165,073 A | 7/1939 | Schwartz | |
| 2,573,856 A | 11/1951 | Malone, Sr. | |
| 2,666,408 A | 1/1954 | Riviere | |
| 3,435,556 A | 4/1969 | Clarke | |
| 3,824,949 A | 7/1974 | Aquila | |
| 4,387,531 A | 6/1983 | Jacob | |
| 4,683,588 A | 7/1987 | Goldberg | |
| 4,690,653 A | 9/1987 | Goldberg | |
| 4,862,625 A | 9/1989 | Dolan | |
| 4,876,674 A | 10/1989 | Parmely et al. | |
| 4,941,858 A * | 7/1990 | Adams | 446/397 |
| 4,957,057 A | 9/1990 | Marcucci | |
| 4,968,283 A | 11/1990 | Montgomery | |
| 5,035,390 A | 7/1991 | Sanders | |
| 5,111,981 A | 5/1992 | Allen | |
| 5,115,472 A | 5/1992 | Park et al. | |
| 5,136,726 A | 8/1992 | Kellin et al. | |
| 5,178,575 A | 1/1993 | Koch | |
| 5,244,430 A | 9/1993 | Legursky | |
| 5,352,146 A | 10/1994 | Shuart | |
| 5,394,565 A | 3/1995 | Stewart et al. | |
| 5,419,304 A | 5/1995 | Pardue | |
| 5,431,590 A | 7/1995 | Abbas | |
| 5,484,316 A | 1/1996 | Poirier | |
| 5,555,664 A | 9/1996 | Shockley | |
| 5,568,127 A | 10/1996 | Bang | |
| 5,607,091 A * | 3/1997 | Musacchia | 224/222 |
| 5,704,154 A | 1/1998 | Galfidi, Jr. | |
| 5,716,254 A | 2/1998 | Bowes | |
| 5,802,197 A | 9/1998 | Fulcher | |
| 5,928,056 A | 7/1999 | Molotschko | |
| 5,947,353 A | 9/1999 | Johnson | |
| 5,964,054 A | 10/1999 | Galfidi, Jr. | |
| 5,988,469 A * | 11/1999 | Musacchia | 224/267 |

(Continued)

*Primary Examiner*—Bena B. Miller
(74) *Attorney, Agent, or Firm*—Holland & Hart (57) ABSTRACT

A slate-type game call includes a flange extending downwardly below the bottom wall of the pot portion of the call. The flange creates a unique sound chamber. One or more apertures may be provided around the flange to assist in projecting sounds from the sound chamber when the call is secured to a support surface. The flange may further include a pair of slots through which a fastening strap can be inserted to secure the call to a person's limb or hunting implement. Relatively narrow channels leading to the strap slots may be formed in the flange to allow the game call to be quickly connected and disconnected from the fastening strap. The configuration of the flange in combination with the flexible fastening strap allows the game call to be pivoted relative to a support surface to which the game call is secured to project and direct sounds from the sound chamber.

23 Claims, 7 Drawing Sheets

U.S. PATENT DOCUMENTS

| | | |
|---|---|---|
| 6,003,261 A | 12/1999 | French |
| 6,010,389 A | 1/2000 | Terll |
| 6,042,452 A | 3/2000 | Niebrugge |
| 6,053,793 A | 4/2000 | Green |
| 6,112,330 A | 9/2000 | Bryan |
| 6,149,492 A | 11/2000 | Davis, Jr. |
| 6,155,244 A | 12/2000 | McClanahan |
| 6,210,251 B1 | 4/2001 | Primos et al. |
| 6,231,418 B1 | 5/2001 | Hancock et al. |
| 6,234,865 B1 | 5/2001 | Battey |
| 6,289,626 B1 | 9/2001 | Williams |
| 6,312,309 B1 | 11/2001 | Ocwieja |
| 6,328,626 B1 | 12/2001 | Eubanks |
| 6,370,807 B1 | 4/2002 | Eisenhut |
| 6,394,875 B1 | 5/2002 | Smith |
| 6,416,379 B1 | 7/2002 | Topman |
| 6,599,167 B2 * | 7/2003 | Waltz .................. 446/397 |
| 6,669,528 B2 * | 12/2003 | Kaelin .................. 446/397 |
| 2001/0018311 A1 | 8/2001 | Musacchia |

* cited by examiner

FRICTION GAME CALL APPARATUS WITH EXTERNAL SOUND CHAMBER

FIELD OF THE INVENTION

This invention relates to game calls, and more particularly to friction game calls.

BACKGROUND OF THE INVENTION

Many types of game calls have been developed over the years for a variety of purposes. Game calls have primarily been developed for simulating the sounds of wild animals. Among others, game calls have been developed to simulate the sounds of big game animals, such as elk and deer, birds and small game.

Turkey calls, in particular, have been the subject of significant research and development efforts over the years. A variety of different types of turkey calls have been developed. Friction calls broadly describes one category of game calls used for producing wild turkey sounds. Within the broad category of friction calls is the narrower category of slate-type game calls. As used herein, "slate-type" game calls means any type of game call that has a flat calling surface (e.g., a flat piece of slate, glass, crystal, aluminum, or any other suitable material) and a striker for contacting the calling surface to produce sounds of wild animals. The calling surface is commonly disc-shaped, but those skilled in the art will understand that a calling surface according to the present invention may be of any shape or size. To create appropriate sounds with a slate-type call, the calling surface is typically conditioned or treated (using sand paper, an emery cloth, a Brillo pad, a stone, or some other abrasive material) to increase the friction resulting from contact between the calling surface and the striker. The striker may be made out of a number of different materials, such as wood, metal, plastic, or any other suitable material as understood by those skilled in the art.

Most traditional slate-type calls have been hand-held calls. An example is shown in U.S. Pat. No. 4,586,912 which is incorporated in its entirety by this reference. In using these traditional slate-type calls, two hands are required: one hand is required to hold the portion of the call that includes the calling surface; another hand is required to hold the striker. For obvious reasons, requiring both hands to be used for slate-type calls has its disadvantages. If two hands must be used to operate the game call, the person using the call may not have a firearm or bow in position to be shot when using the game call. Turkeys, for example, have phenomenal eyesight, and can catch even the smallest of movements when they are within shooting range. The more movement when calling turkeys, the more likely a turkey will see the person doing the calling. The actions of putting down the game call and picking up a bow or firearm require movement which may result in a lost opportunity to harvest the game animal.

Still another problem with traditional slate-type game calls relates to the projection of sound produced by the call. A slate-type material is typically seated inside of a so-called pot or cup. The pot has an open end and side walls. A calling surface in the form of a circular disc is secured to open the end of the pot. A sounding board may also be mounted inside the call between the calling surface and the closed end of the pot. One or more apertures may be formed on the closed end of the pot to allow sound to escape from the closed end. While sound is projected both above and below the calling surface, a majority of the sound generated by the call passes toward the closed end of the pot. Typically the sounding board is elevated to some degree from the bottom surface of the pot so that the sounds will be appropriately amplified and resonated. To create proper sounds with traditional friction game calls, the bottom surface must not touch anything, otherwise the sounds produced by the call will be adversely affected.

In view of the foregoing, there is a need to provide a slate-type call that is suspended above a surface on which the call is supported. There is further a need to provide a slate-type game call that includes an external sound chamber to assist in resonating and amplifying sounds created by the slate-type call. Still further, there is a need to provide a slate-type game call that can project sounds produced by the call directionally when the call is mounted to a surface. Additionally, there is a need to provide a slate-type game call that can be quickly secured and removed from a person's limb or from a firearm or archery bow.

SUMMARY OF THE INVENTION

The foregoing objects are achieved by a slate-type call having a flange extending downwardly below the bottom wall of the pot portion of the call. The flange or skirt creates a unique sound chamber, which is external relative to the traditional portions of a typical slate-type call (e.g., the pot with the calling surface and sounding board mounted therein). One or more apertures may be provided around the flange to assist in projecting sounds made by the call toward a particular direction when the call is supported on a surface. The flange may further include a pair of slots through which a strap or other fastening device can be inserted to strap the call to a person's limb or to a hunting implement (e.g., a firearm or an archery bow). Relatively narrow channels leading to the strap slots may be provided in the flange such that the game call can be quickly connected to and disconnected from the fastening strap when desired. A narrow, necked-down grasping area is provided between the bottom wall of the pot and the flange to aid the user in holding the call. A pair of textured surface areas may be provided in the necked-down area to assist the user in gripping the call. The configuration of the flange in combination with the flexible strap which allows the game call to be pivoted relative to a support surface to which the game call is secured to project and direct sounds from the sound chamber.

The foregoing and other features, utilities, and advantages of the invention will be apparent from the following detailed description of the invention with reference to the accompanying drawings.

DETAILED DESCRIPTION OF THE INVENTION

The present invention involves a game call 10 for use primarily in producing sounds that simulate sounds of wild turkeys. In one embodiment, the game call 10 is a slate-type call. The terms "slate-type call" mean any type of call where two structural elements are brought into contact with another to create sounds, including without limitation calls involving a striker and a flat calling surface made out of any material that may be used to produce sounds, such as without limitation slate, glass, crystal, aluminum or the like. It is to be understood that the present invention may also be used in conjunction with other friction calls, such as without limitation lid-actuated box calls, push button box calls, and rotary calls (i.e., calls that require rotation of one structural element relative to another structural element while maintaining contact between the two elements).

Figure 1:
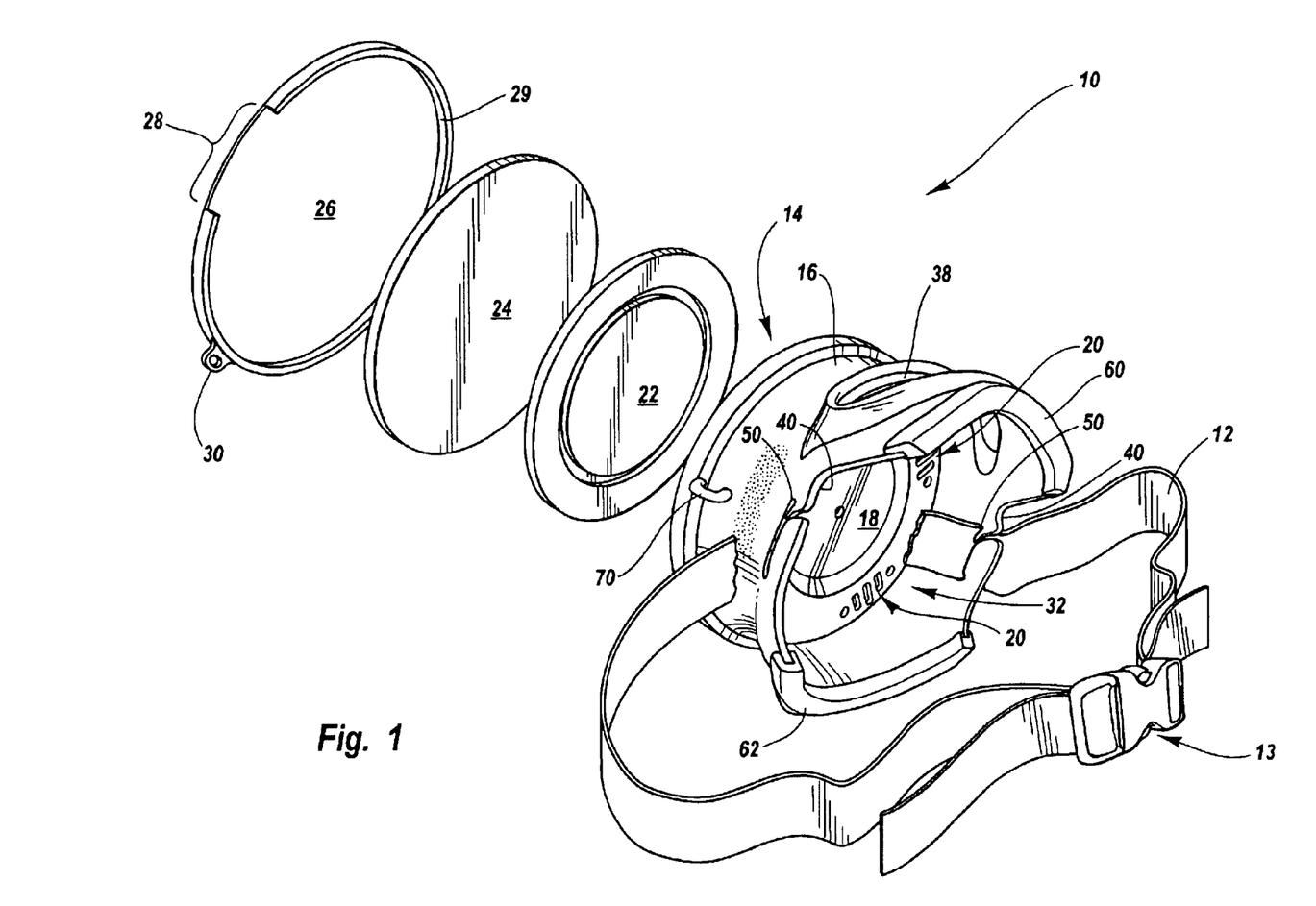
FIG. 1 is an exploded perspective view of a game call according to the present invention.

FIG. 1 shows a game call 10, which can be secured to a limb of a person using the call, or to a firearm (FIG. 8), archery bow, or other hunting implement by means of a fastening strap 12. As will be discussed below, the strap 12 is adjustable so that it can secure the game call 10 to objects of different configurations and dimensions. The game call 10 is preferably positioned on a person's limb or other object to allow the game call to be manipulated by a one-handed operation. That is, the person using the call does not have to hold the calling surface, but instead is required only to hold the striker 80 (FIG. 6) to use the call. Such one-handed operation allows the user to hold the firearm, archery bow, or other hunting implement in position for a shot while continuing to call for a longer period as compared to prior art game calls to bring the animal in closer before the shot. If two hands are required to operate the call, the call must be set down before the user can appropriately position the hunting implement to harvest the particular game animal. The strap 12 may further serve to hold temporarily a striker 80 (FIG. 6) after using the call and before the shot.

Figure 2:
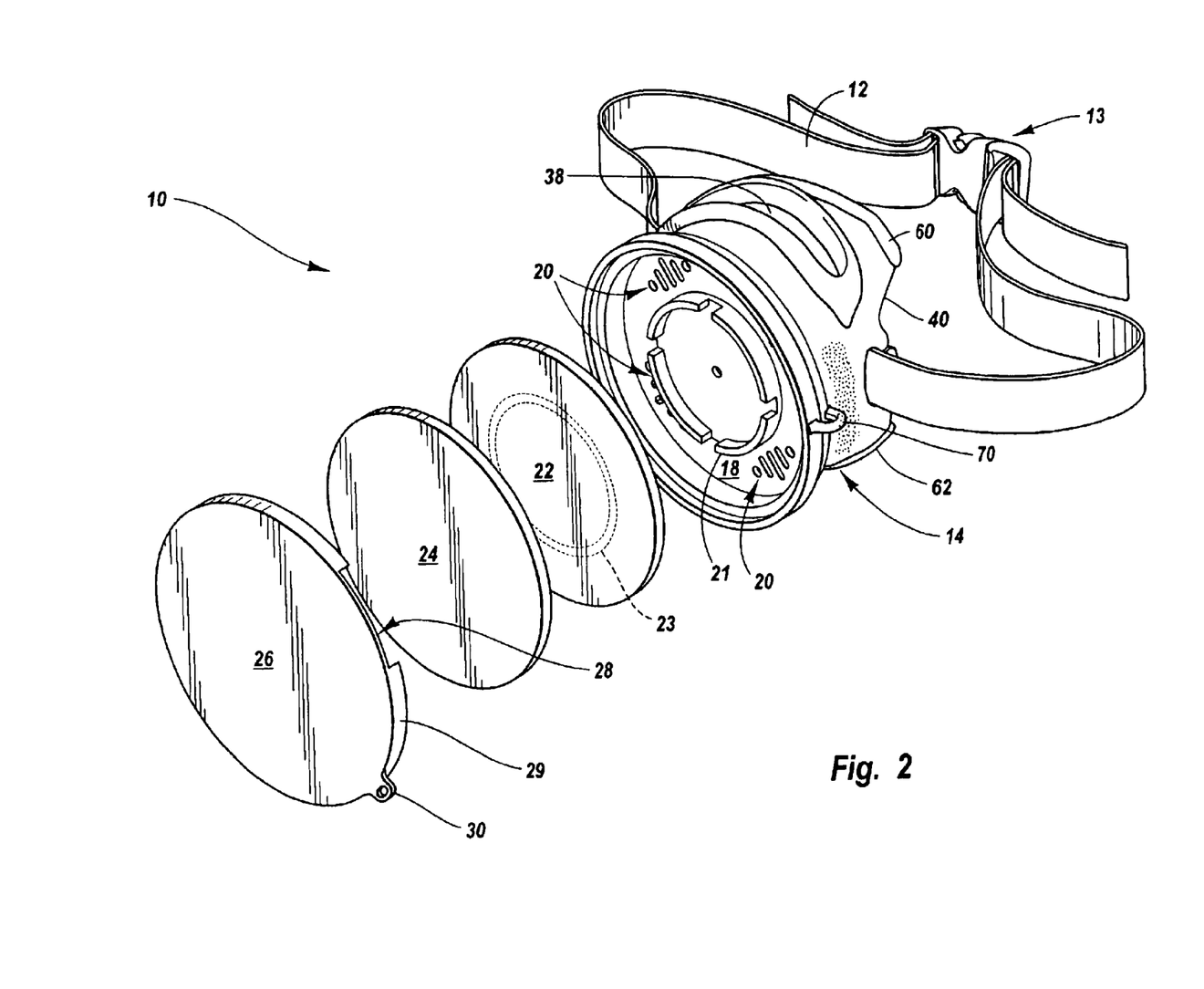
FIG. 2 is an exploded perspective view, reversed 180° as compared to FIG. 1, of a game call according to the present invention.
Figure 3:
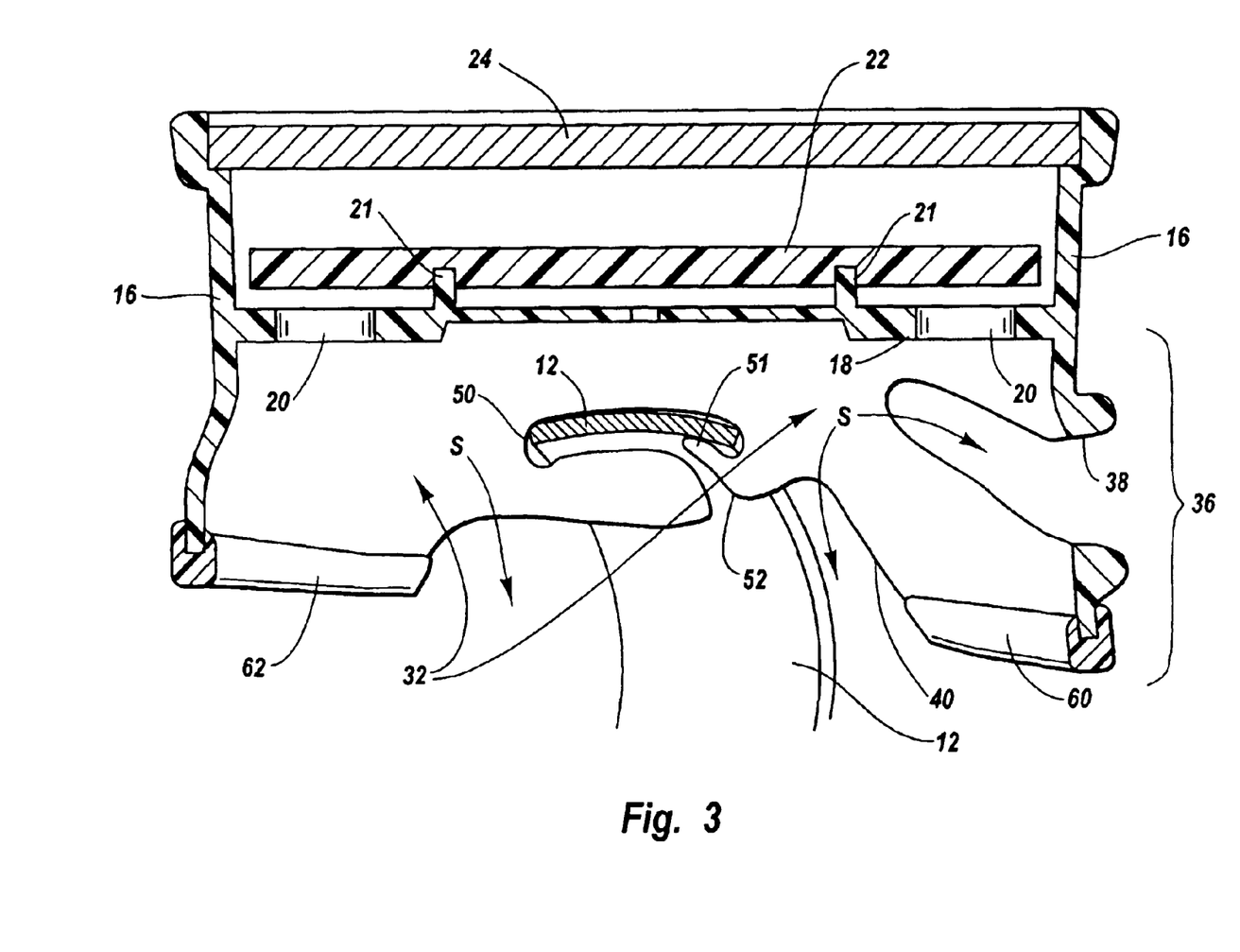
FIG. 3 is a sectional side elevation view of a game call according to the present invention.
Figure 4:
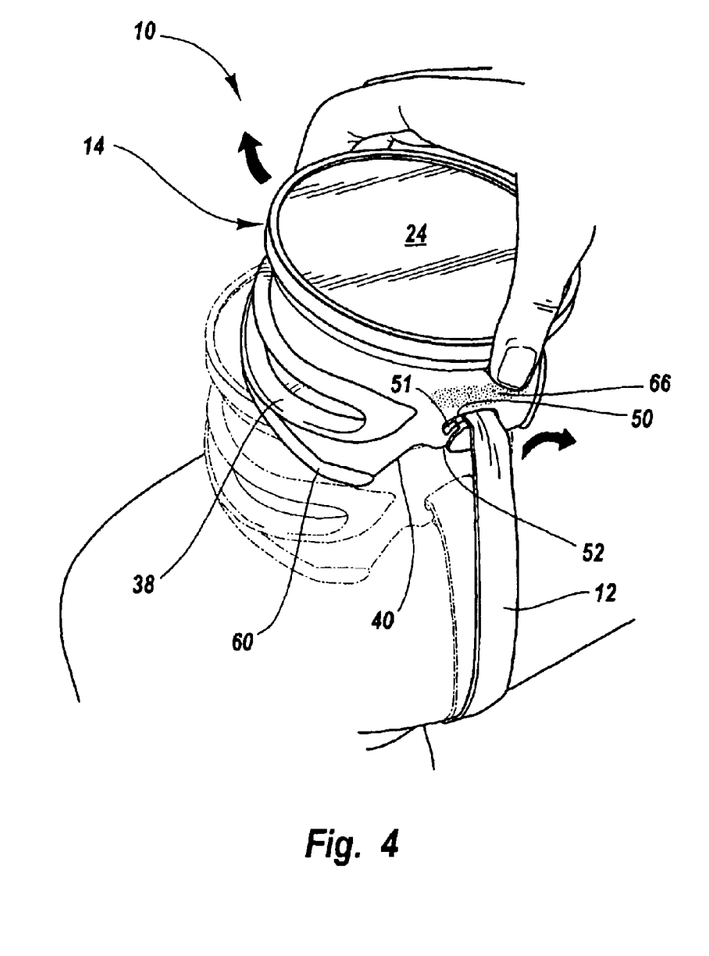
FIG. 4 is a perspective view of a game call according to the present invention being pulled away from a user's leg when preparing to quickly disconnect the call from the fastening strap.

As shown in FIGS. 2 and 3, a game call 10 according to the present invention comprises a base or housing section 14. In the present embodiment, the base 14 comprises essentially two sections. A first section 16 forms what would normally be the side walls of a standard pot or cup for traditional slate-type calls. The game call 10 further comprises a bottom wall 18 of the cup portion, a sounding board 22 coupled to the bottom wall 18, and a flat disc-shaped calling surface 24. A flange portion 36 (FIG. 3), described in greater detail below, is coupled to and extends below the bottom wall 18. The housing 14 may be made of any suitable material, including without limitation any type of synthetic or plastic material. As shown in FIGS. 2-4, the housing 14 may be a unitary piece made of a single, continuous piece of material so that the standard pot portion and the flange portion are formed as a single, continuous piece of material. Those skilled in the art will understand, however, that other methods of joining together the pot portion and the flange portion will be understood by those skilled in the art, and that such alternative joining methods will not depart from the spirit and scope of the present invention.

The game call 10 may be held in a user's hand, or alternatively may be secured to a user's limb (e.g., a leg) by means of a fastening strap 12. The term "strap" means any elongated member of any suitable material that can secure the game call to a support surface. The fastening strap 12 includes a snap-buckle assembly 13 that can be used to quickly connect and disconnect the strap 12 to a person's leg or arm or hunting implement. The length of the strap 12 is adjustable so that the game call can be strapped to objects of various configurations and dimensions.

As show in FIG. 1, the bottom wall 18 may include a plurality of apertures or sets of apertures 20 to assist in projecting sounds from the bottom of the call opposite the calling surface 24. The apertures 20 may be of any form, including without limitation, the configuration shown in FIG. 1.

A sounding board 22 is secured on lands or upright walls 21 (FIG. 2) integrally extending upwardly from the bottom wall 18 of the game call. The sounding board 22 provides appropriate tone qualities to the sounds produced by the call and amplifies and directs said sound toward and eventually through the bottom wall 18 (primarily through apertures 20) of the call 10.

The top-most structure of the call is a disc-shaped, flat calling surface 24. The calling surface 24 comprises a material that has sound-producing characteristics when brought into contact with another object, such as a striker. The calling surface 24 may be made of, without limitation, metal, crystal, slate, stone, synthetic material, or any other suitable material capable of producing desired sounds. After the calling surface is roughed up in a traditional way, a striker 80 (FIG. 6) is brought into contact with the calling surface 24 in a conventional manner to produce all types of wild animal sounds, including without limitation wild turkey sounds including purrs, yelps, clucks, and cuts.

A cover 26 may be provided with the game call 10 to cover the call and protect the calling surface 24. As shown in FIGS. 1 and 2, the cover 26 includes a peripheral extension or rim 29 to hold the cover 26 on the housing 14, and a slot 28 which corresponds with and accommodates a lanyard ring or other structure formed on the housing. A lanyard ring 70 (FIGS. 1 and 2) may be provided on housing 14 to hold a lanyard (not shown), or any other component that may be used with the call (e.g., sand paper, emery cloth, or a scouring pad attached to a cord) for conditioning the calling surface. The cap itself may further include its own lanyard ring 30.

As shown in FIG. 2, the base or housing 14 receives and secures the sounding board 22 and the calling surface 24. The housing 14 further comprises a flange portion 36 (FIG. 4) that creates a sound chamber 32 (FIGS. 1 and 3). Sound chamber 32 provides a number of unique advantages. First, the sound chamber 32 enhances the resonance and tonal qualities of sounds produced by the game call. Second, the sound chamber 32 provides a compact, well-defined area that acts as a sound source such that the sounds produced by the game call can be directed toward a desired location. In one embodiment, sounds are directed from the sound chamber 32 through one or more apertures formed in the call (discussed below in more detail). Third, the flange portion 36 that extends below the bottom wall 18 of the call 10, to ensure that the call 10 is elevated above a support surface (i.e., the user's leg, the butt of a firearm, etc.) so that sounds can escape from the bottom of the call when the call is secured to a support surface. With respect to traditional slate-type calls that have no such flange area or external sound chamber, the bottom surface of the game call may contact a support surface or other object, such as the user's thigh or in the palm of a user's hand. This adversely affects the tones, as well as amplification and projection, of the sounds produced by the game call 10.

The housing 14, as shown in FIG. 3, more specifically comprises a flange or extension 36, which corresponds to the amount of housing 14 that extends below the bottom wall 18 of the call 10. "Flange" means any type of structure, including any form of interrupted structure, that extends below bottom wall 18. A mouth or main opening 38 is formed in the flange 36 to provide an aperture through which sound is projected when the call 10 is secured to a support surface. The mouth 38 generally has the configuration of a mouth, with a smile or concave appearance. The mouth 38 further comprises a raised peripheral edge, which has the appearance of "lips." The mouth 38 is generally the main aperture through which sound passes from the sound chamber 32 (FIG. 2) to the outside of the game call 10 when the game call 10 is secured to a support surface. Side openings 40 are also formed in flange portion 36 to allow sound to be projected through the sides of the call. Side openings 40 are smaller than the mouth 38. Side openings 40 may be covered by the user's hand when using the call to cause virtually all sound from inside the sound chamber 32 to be projected through the mouth 38 when the call is secured to a support surface.

Figure 5:
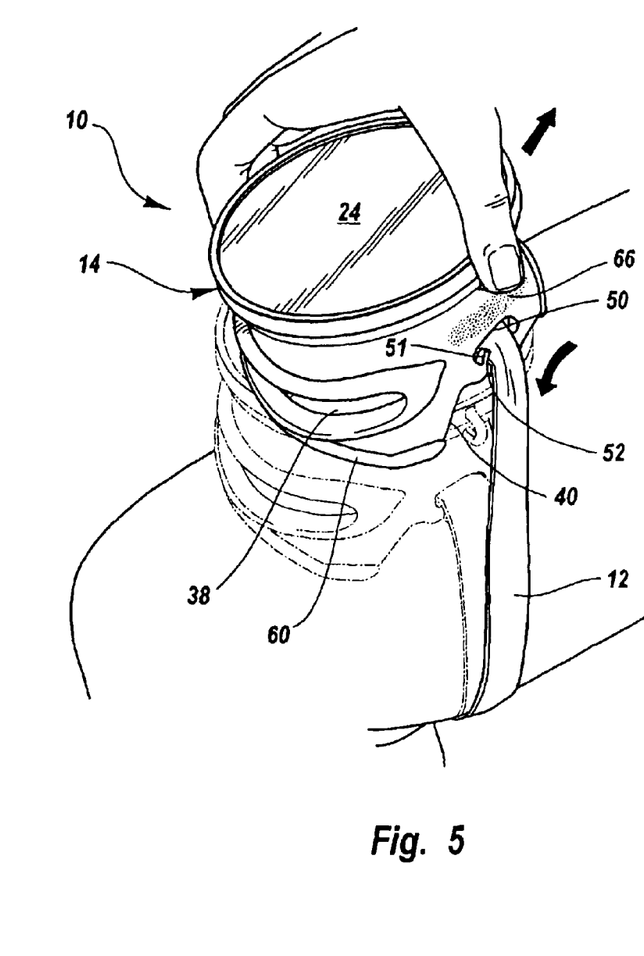
FIG. 5 is a perspective view of the game call of FIG. 5 being removed from the fastening strap to quickly disconnect the game call from the user's leg.

The game call 10 further comprises slots 50 formed in the flange 36 to receive a fastening strap 12. Fastening strap 12 is preferably made of a suitable elastic material. Narrow channel areas 52 (FIG. 3) are formed adjacent slots 50 to allow the strap 12 to be quickly inserted into and removed from slots 50. When the strap 12 is inserted completely into slot 50, respective fingers or projections 51 are provided to separate strap 12 from the narrow channels 52. The slots 50, projections 51, and the narrow channel areas 52 provide a "quick disconnect" feature of the call. With reference to FIGS. 4 and 5, when using the call, the hunter will be stationary, preferably seated, with the call 10 strapped to the hunter's leg. After the call has been used, the hunter may need to move to a different location. sometimes this requires that the hunter run to a different location. In so doing, if the call remains strapped to the user's leg, the weight of the call will generally cause the call to slide down the user's leg. The quick disconnect feature allows the hunter to quickly remove the call from the strap while moving to a different location. To use the quick disconnect feature, the user will grasp the call 10, pulling the call upward and slightly forward relative to its position when strapped to the user's leg (shown in phantom). This will cause the strap 12 to be gathered toward the rear of slots 50 (only one shown) and clear extensions 51, as shown in FIG. 4. Thereafter, while continuing to pull upward on the call, the call is rocked forward so that the straps slide below extensions 51 and out of the narrow channels 52 to release the call 10 from strap 12. This quick disconnect method can be accomplished in less than one second. After the call 10 has been disconnected from strap 12, the user can reposition him or herself and secure once again call 10 to the strap 12 by inserting the strap through the narrow channels 51 and ultimately into the retaining slots 50.

Figure 8:
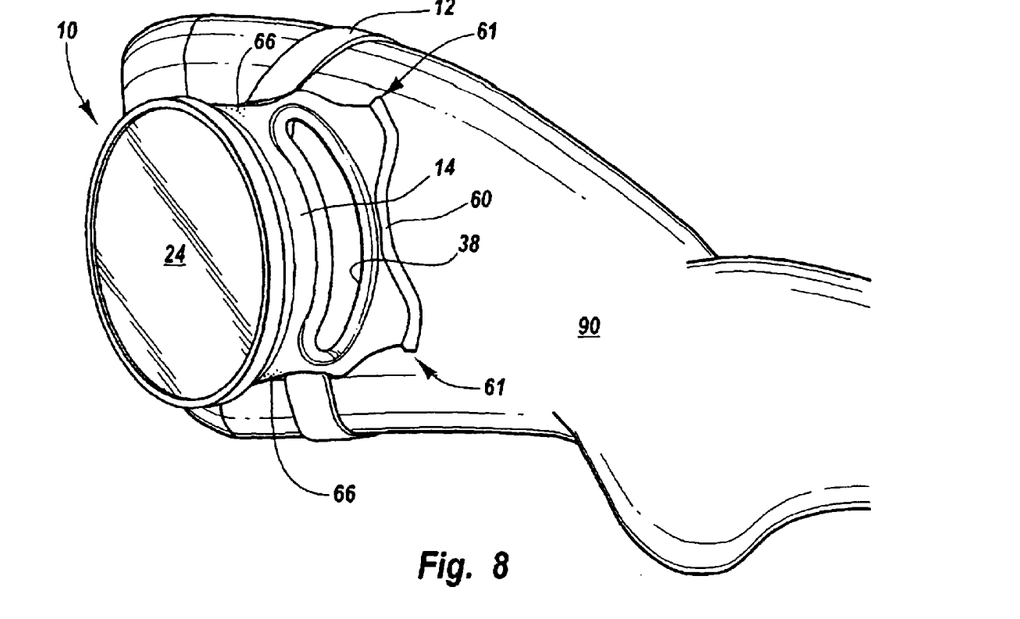
FIG. 8 is a perspective view of a game call according to the present invention secured to a firearm stock.

Referring again to FIG. 3, a pair of bumpers or support pads 60, 62 are inserted over the distal ends of flange 36. Bumpers 60, 62 bear against the supporting surface that supports the game call. The bumpers 60, 62 may be of soft rubber to quiet any noise that otherwise may be created when attaching the call to a support surface. The bumpers 60, 62 thus provided cushioned feet for the call. As shown in FIGS. 3–6, the feet 60, 62 include contoured bottom surfaces that generally correspond to a user's limb (e.g., a user's thigh). If the support surface is less contoured than the contour of bumpers 60, 62 (e.g., the firearm stock 90 as shown in FIG. 8), then only the extreme ends 61 of the bumpers 60, 62 (e.g., the ends 61 of the bumper 60 adjacent opening 40) will contact the support surface, similar to four individual legs.

Figure 6:
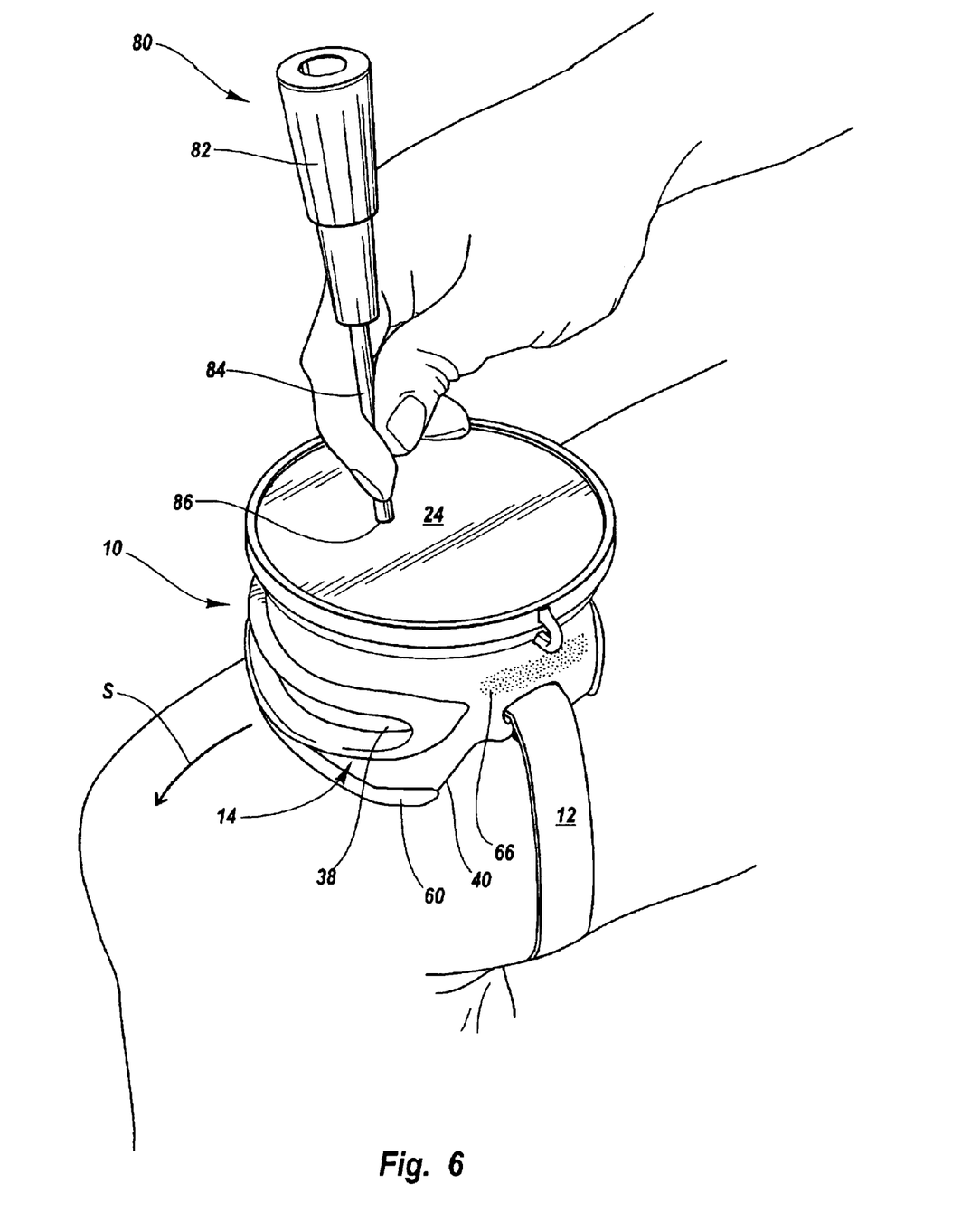
FIG. 6 is a perspective view of a game call according to the present invention secured to a user's leg.

The call is ergonomically constructed. Specifically, the portion of flange 36 that corresponds with bumper 60 is slightly longer than the flange portion that corresponds with bumper 62. This difference in flange heights accommodates for the natural position of a user's hand holding a striker when the user is sitting down with the call 10 strapped to the user's thigh, as shown in FIG. 6.

Figure 9:
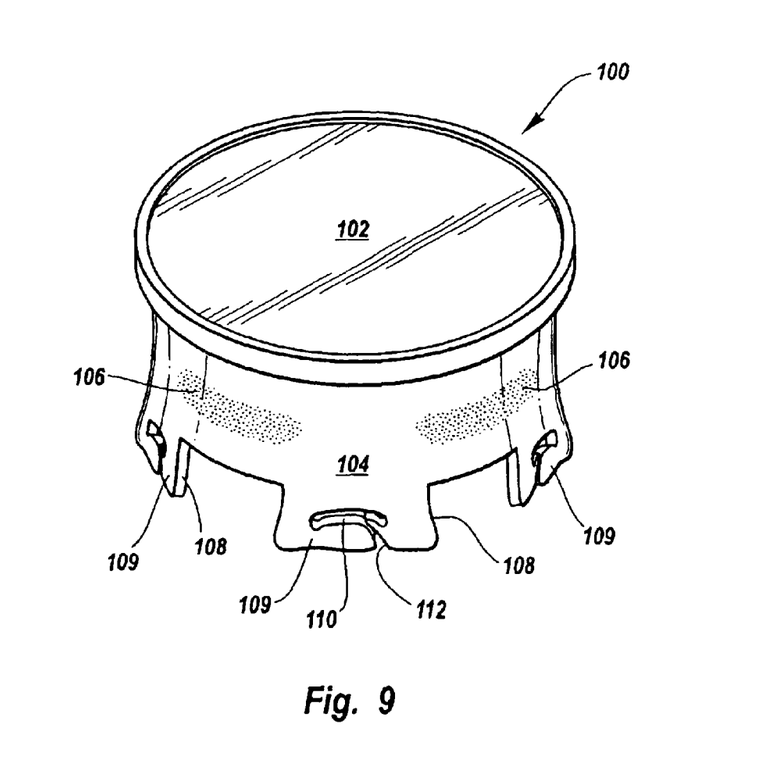
FIG. 9 is an alternative embodiment of a game call according to the present invention.

An alternative embodiment of the present invention is shown in FIG. 9. The alternative embodiment comprises a game call 100 with a calling surface 102, a sounding board (not shown), and a bottom wall (not shown), similar to the embodiment described in connection with FIGS. 1–8. The housing 106 in the embodiment of FIG. 9 is unique in that it comprises a flange 104 having a plurality of supports or legs 109 and a plurality of cut-out areas 108 that provide openings through which sound from the bottom of the call 100 can pass. "Support" means any structure that suspends the bottom wall 20 of the game call 10 above a support surface. While the embodiment of FIG. 9 shows a flange 104 used in combination with supports 109, it is to be understood that one or more supports 109 may be used without any flange 104. Each support 109 includes a slot 110 and a narrow channel area 112 for receiving the strap (not shown), similar to the embodiment described in connection with FIGS. 1–8. The plurality of slots 110 allow the game call 100 to be secured in at least two different directions relative to a particular mounting object. Still further, the legs 109 allow the game call 100 to be placed on a support surface so that the call remains elevated relative to the support surface and sound can be projected through the openings 108 formed in the flange 104. Those skilled in the art will understand that other flange configurations may be used without departing from the scope of the present invention.

Figure 7:
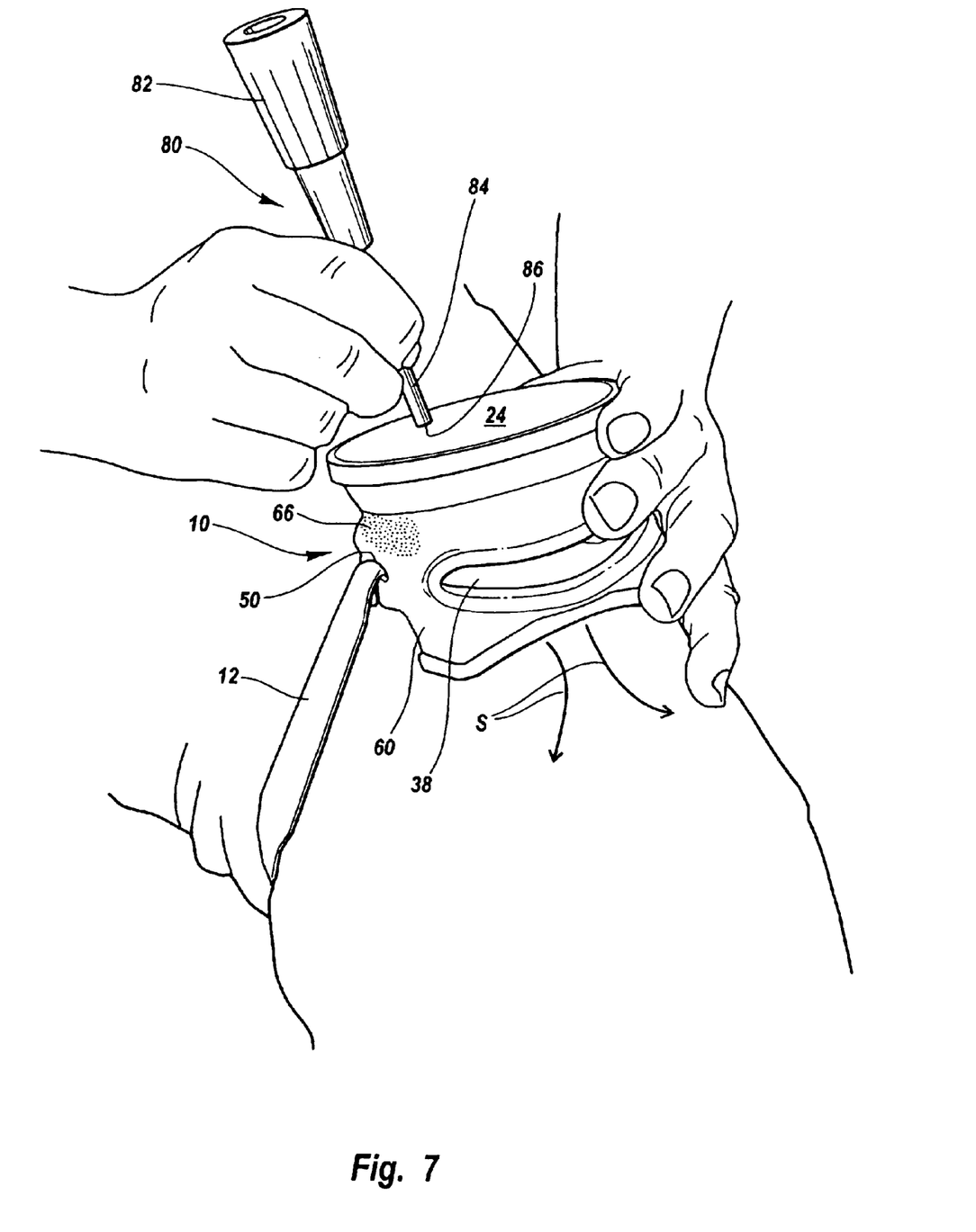
FIG. 7 is a perspective view of a game call according to the present invention, where the game call is being pivoted relative to the user's leg to amplify and direct sounds from the sound chamber of the game call in a particular direction.

In using the call, textured areas 66 (FIGS. 4–6) may be incorporated into the necked-down area of housing 14 to facilitate grasping of the call 10 as shown in FIG. 7. Textured areas 66 may also be used to hold the game call when not strapped to a user's limb or another support surface.

While using the game call of the present invention, as shown in FIG. 7, a striker 80 is grasped by the user around the main elongated area 84. A bell-shaped end 82 is opposite the distal end 86 of striker 80. Distal end 86 is intended to frictionally engage the calling surface 24. When the housing 14 is secured to a user's limb or other similarly configured support surface, sounds S will be projected primarily through mouth 38 and side openings 40. Still further, for additional amplification and directional calling when the call remains secured to a support surface, the game call 10 can be pivoted about leg 62 (not shown in FIG. 7) such that sounds will be projected directly from the sound chamber formed at the bottom of the call toward a desired direction. This method will produce the loudest types of calls, and will project sound in a desired direction while the call remains strapped to a support surface.

While this invention has been described with reference to certain specific embodiments and examples, it will be recognized by those skilled in the art that many variations are possible without departing from the scope and spirit of this invention. The invention, as defined by the claims, is intended to cover all changes and modifications of the invention which do not depart from the spirit of the invention. The words "including" and "having," as used in the specification, including the claims, shall have the same meaning as the word "comprising."

What is claimed is:

1. A game call apparatus, comprising:
   a calling surface;
   a sounding board;
   a housing configured to hold the calling surface and the sounding board spaced from the calling surface, the housing further comprising a bottom wall
   a flange forming an integral part of the housing, the flange extending from the bottom wall, the flange creating a sound chamber below the bottom wall.

2. A game call according to claim 1 wherein the flange terminates at an edge comprising a contoured surface.

3. A game call according to claim 1 wherein the flange terminates at an edge comprising a contoured surface, the contoured surface of the edge corresponding generally to a surface of a person's leg.

4. A game call according to claim 1 wherein the flange comprises an aperture for directing sounds generated by the call.

5. A game call according to claim 1 wherein the flange comprises a plurality of apertures for directing sounds generated by the call.

6. A game call according to claim 1 wherein the housing comprises a necked-down portion adjacent the flange.

7. A game call according to claim 1 wherein the housing comprises a necked-down portion adjacent the flange, and further comprising a pair of textured surface areas formed at the necked-down portion to assist in grasping the call.

8. A game call according to claim 1, further comprising a strap coupled to the housing to hold the game call to a support surface.

9. A game call according to claim 1, further comprising a strap coupled to the housing to hold the game call to a person's leg.

10. A game call according to claim 1, further comprising a strap coupled to the housing to hold the game call to a firearm stock.

11. A game call, comprising:
    a friction game call, comprising a calling surface, a sounding board, and a bottom wall;
    a support extending below and integrally formed with a housing, the support maintaining a base above a support surface when the friction game call is positioned on the support surface;
    a sound chamber formed by the support to resonate sounds generated by the game call.

12. A game call according to claim 11 wherein the support creates a sound chamber to resonate sounds generated by the game call.

13. A game call according to claim 11 wherein the support terminates at an edge comprising a contoured surface.

14. A game call according to claim 11 wherein the support terminates at an edge comprising a contoured surface, the contoured surface of the edge corresponding generally to a surface of a person's leg.

15. A game call according to claim 11 wherein the support comprises an aperture for directing sounds generated by the call.

16. A game call according to claim 11 wherein the support comprises a plurality of apertures for directing sounds generated by the call.

17. A game call according to claim 11 wherein the housing comprises a necked-down portion adjacent the support.

18. A game call according to claim 11 wherein the housing comprises a necked-down portion adjacent the support, and further comprising a pair of textured surface areas formed at the necked-down portion to assist in grasping the call.

19. A game call according to claim 11, further comprising a strap coupled to the housing to hold the game call to a support surface.

20. A game call according to claim 11 further comprising a strap coupled to the housing to hold the game call to a person's leg.

21. A game call according to claim 11 further comprising a strap coupled to the housing to hold the game call to a firearm stock.

22. A method of using a game call apparatus, comprising:
    providing a calling surface;
    providing a sounding board;
    providing a housing including a bottom wall configured to hold the calling surface and the sounding board;
    providing a flange extending below the bottom wall and an aperture formed in the flange to create a sound chamber;
    positioning the game call on a support surface with the aperture facing toward a particular direction to direct sounds from the sound chamber toward the direction.

23. A method of using a game call apparatus, comprising:
    providing a calling surface;
    providing a sounding board;
    providing a housing including a bottom wall configured to hold the calling surface and the sounding board;
    providing a flange extending below the bottom wall and an aperture formed in the flange to create a sound chamber;
    positioning the game call on a support surface with the aperture facing toward a particular direction to direct sounds from the sound chamber toward the direction;
    pivoting the call about a portion of the flange to open the sound chamber and direct sounds from within the sound chamber toward a desired location.

* * * * *